UNITED STATES PATENT OFFICE 2,343,256

PROCESS FOR THE CONDENSATION OF MONONITROALKANES AND ALIPHATIC KETONES

Henry B. Hass, West Lafayette, Ind., and James F. Bourland, Martinsville, N. J., assignors to Purdue Research Foundation, La Fayette, Ind., a corporation of Indiana No Drawing. Application August 25, 1941, Serial No. 408,207

6 Claims. (Cl. 260—644)

Our invention relates to the condensation of nitromethane with ketones. More particularly, it relates to the condensation of nitromethane with aliphatic and alicyclic ketones to produce dinitro compounds and nitro ketones.

Fraser and Kon (J. Chem. Soc. 1934, 604), in the course of an investigation of the effect of the nitro group in three-carbon tautomerism, reported the condensation of cyclohexanone, acetone, and some homologous ketones with nitromethane by allowing the reacting materials to stand together for from 12 to 24 hours in the presence of one of a number of bases, including sodium ethoxide, piperidine, pyridine, methylamine, and "molecular" sodium. Of these, sodium ethoxide and piperidine were claimed to be the most efficacious. With the exception of cyclohexanone, all of the ketones tried were said to condense with two moles of nitromethane to give a 1,3-dinitroalkane according to the equation:

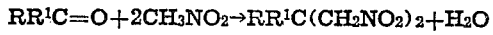

These investigators claimed yields ranging from 15 to 25% with methyl ethyl, diethyl, and methyl propyl ketones. Judging from the lack of success in attempts to duplicate Fraser and Kon's results and the discrepancies in the physical properties of the compounds which they claimed to have obtained, it is evident that this disclosure is inoperative and does not enable one skilled in the art to obtain the compounds described.

We have now found that by suitable changes in the reaction conditions described by Fraser and Kon markedly increased conversions and yields of dinitro compounds such as 1,3-dinitroalkanes, may be produced, and at the same time good yields of nitro ketones obtained. Furthermore, by regulating the proportions of reactants and operating conditions we may change, as desired, the relative proportions of the dinitro compounds, such as 1,3-dinitroalkanes, and the nitro ketones produced in the process. Other advantages of our improved process will be evident from the disclosure which follows.

We carry out our improved process by effecting condensation between nitromethane and an aliphatic or alicyclic ketone at elevated temperatures, preferably of the order of the reflux temperature of the reaction mixture, in the presence of basic catalysts such as the amines. By using a molar excess of the nitromethane, primarly dinitroalkane is obtained, whereas by using a molecular excess of the ketone in the reaction mixture, the reaction proceeds in a manner so as to give a greater proportion of nitro ketone than dinitroalkane. While the course of the reaction is not definitely known, and hence we do not desire to be bound thereby, we believe that the reaction proceeds in accordance with the manner shown by the following equations illustrating the reaction between nitromethane and acetone.

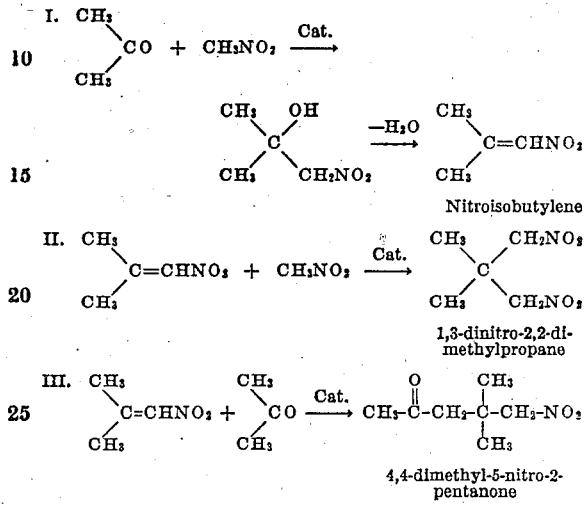

According to the theory expressed by the above equations, the first step in the process of producing either dinitroalkane or nitro ketone comprises condensing nitromethane and acetone in the presence of a catalyst to give nitroisobutylene. When the latter condenses with an additional equivalent of nitromethane by the above equation the product is the dinitroalkane; if, however, the nitroisobutylene reacts with an additional equivalent of acetone, the product is the nitro ketone. The proportions of the reaction products may be readily changed, in the manner indicated above, by changing the ratios of the reactants, a mixture of 1,3-dinitro-2,2-dimethylpropane and 4,4-dimethyl-5-nitro-2-pentanone being ordinarily produced. The proportions of each product actually obtained in any particular case, while primarily dependent on the ratio of the reactants, are also affected to some extent by some of the factors discussed below. In reacting nitromethane with ketones other than acetone, however, the reaction proceeds somewhat differently, the reaction product consisting primarily of the dinitro compound with little, if any, nitroketone.

The actual ratio of ketone to nitromethane employed in any given case depends partly on certain economic considerations. While the proportion of nitro ketone, when reacting acetone with nitromethane, is increased by increasing the proportion of acetone to nitromethane, the size of the equipment required to produce a given amount of the nitro ketone increases at the same time, and since the reaction is preferably carried out under pressure, the cost of the larger apparatus is a significant item. Furthermore, little, if any, technical advantage has been found in increasing the ratio of acetone to nitromethane substantially above five or six moles to one. If, on the other hand, the dinitroalkane is desired the ratio should preferably not exceed one to one and for most satisfactory results should be of the order of one mole of acetone to three moles of nitromethane. When the ratio falls below this value the disadvantages occurring from the necessity for larger equipment exceed the advantages in increased proportions of dinitroalkanes. Furthermore, with ratios of nitromethane to acetone substantially above 3:1 the yield actually decreases, presumably because the side-reaction resulting from the effect of the alkaline catalysts upon the nitromethane becomes of greater importance.

Although Fraser and Kon have claimed that 1,3-dinitroalkanes could be produced by condensing ketones and nitroalkanes at room temperatures the yields reported by them were quite low. We have found that by effecting the condensations at elevated temperatures for longer periods of time and with higher concentrations of catalysts substantially higher conversions and yields are obtained. For example, using the same amounts of a particular catalyst, at room temperature a 25% total conversion may be obtained in two weeks; at 80° C. a 50% total conversion is obtained in one day; at 115° C. a slightly higher conversion is obtained in the same length of time. The practical upper limit of reaction temperature is the temperature above which substantial decomposition of the reaction mixture and products thereof begins. With nitromethane the practical upper limit for the reaction appears to be approximately 125° C., as above this temperature excessive decomposition of nitromethane begins. We have, however, carried out the reaction by heating the reactants for a period of ten hours at 180° C., but under such conditions both the conversions and yields were low. A preferred method of carrying out the process comprises effecting the condensation at the reflux temperature of the reaction mixture. When it is desired or necessary to use higher temperatures, the operation must necessarily be carried out under pressure. We have satisfactorily employed both methods.

As previously noted, a catalyst is required for effecting condensation of ketones and nitromethane to give dinitroalkanes, and nitro ketones. We have found that amines which form homogeneous mixtures with the reaction mixture and which have dissociation constants in excess of $1 \times 10^{-7}$, are most effective. In choosing an amine for use as a catalyst in a given operation it is necessary also to take into consideration the matter of how readily the catalyst may be separated from the reaction mixture, as well as the cost of the particular amine, and the amount required for effective results. In the latter connection, we have found it essential to use in excess of five mole per cent of catalyst, based on the weight of the nitromethane, in order to obtain satisfactory results. By using an amount of catalyst in excess of this amount the yields and conversions for a given temperature and time are materially increased. Similarly, they are increased by maintaining the amount of catalyst constant and increasing either the time or the temperature of the reaction, or within certain limits by an increase of all three of these factors. When, for example, the amount of catalyst is substantially increased it is advisable to reduce somewhat the time and temperature of reaction in order to obviate formation of by-products with corresponding reduction in yields and conversions. Examples of suitable catalysts of the type indicated above include: dimethylamine, trimethylamine, diethylamine, triethylamine, dibutylamine, tributylamine, diamylamine, triamylamine, diethanolamine, piperidine, piperazine, morpholine, etc. It should be noted however, that the secondary amines ordinarily give much better results than the tertiary amines. Primary amines may also be employed when not too volatile under the reaction conditions chosen.

Variations in the specific catalysts employed, as well as the amounts thereof, affect results obtained. For example, although we have found piperidine the most active of the catalysts tested, by increasing the time of reaction diethylamine can be made to approach piperidine in the amount of dinitroalkane produced. Similarly, dibutylamine also gives much better yields if the amount of catalyst and time of reflux are doubled, as compared to the amount and time required for a satisfactory yield with piperidine.

The following examples will illustrate our improved method of producing dinitroalkanes and nitro ketones. It is distinctly understood, however, that we are not limited to the specific procedures therein set forth but include within the scope of our invention the usual equivalents.

EXAMPLE I

A mixture of 61 parts by weight (1 mole) of nitro-methane, 295 parts by weight (5 moles) of acetone, and 10 parts by weight (0.22 mole) of dimethylamine was heated in a steel pressure reaction vessel at 110° C. for 48 hours. The brown reaction mixture was first washed with water, then with dilute hydrochloric acid, and again with water, and finally dried and distilled. The following products were obtained.

| | Conversion per cent on nitromethane |
|---|---|
| 4,4-dimethyl-5-nitro-2-pentanone | 53.5 |
| 1,3-dinitro-2,2-dimethylpropane | 18.5 |

By extracting the wash waters with ether, an additional 10% conversion was obtained.

EXAMPLE II

In this experiment, the proportion of the 1,3-dinitro-2,2-dimethylpropane was increased and that of the 4,4-dimethyl-5-nitro-2-pentanone decreased by increasing the proportion of nitromethane used in the reaction. A mixture of one mole of nitromethane, one mole of acetone, and one-tenth mole of piperidine was heated for twenty-four hours at approximately 105° C. and the products of the reaction recovered as described in Example I. A conversion of 54.5% of 1,3-dinitro-2,2-dimethylpropane and 5.0% of 4,4-dimethyl-5-nitro-2-pentanone, based on the nitromethane, was obtained. This did not include a small additional amount of each compound not recovered from the wash water.

The following table shows how the ratio of 1,3- dinitro-2,2-dimethylpropane and 4,4-dimethyl-5-nitro-2-pentanone may be changed by changing the proportions of the reacting acetone and nitromethane. In each of the experiments recorded in Table I the operations were carried out substantially as described in Examples I and II, using dimethylamine as the catalyst.

Table I

| Time | Temp. | Moles taken | | | Conversion | | |
|------|-------|-------------|---|---|------------|---|---|
| | | Me₂CO | MeNO₂ | Catalyst | Dinitro-alkane [1] | Nitro-ketone [2] | Total |
| Hours | °C. | | | | | | |
| 22 | 85–105 | 1 | 1 | 0.14 | 44.7 | 12.9 | 57.6 |
| 22 | 85–105 | 3 | 2 | 0.16 | 38.5 | 18.7 | 57.2 |
| 45 | 105 | 2 | 1 | 0.15 | 29.6 | 27.7 | 57.3 |
| 45 | 105 | 3 | 1 | 0.20 | 24.7 | 37.8 | 62.5 |
| 45 | 105–110 | 4 | 1 | 0.15 | 17.3 | 46.8 | 64.1 |

[1] 1,3-dinitro-2,2-dimethylpropane.
[2] 4,4-dimethyl-5-nitro-2-pentanone.

The data given in Table II below show the character of results obtained when substituting other ketones for acetones in our process. In each case the operation was carried out substantially as described in Examples I and II above.

Table II

| Ketone | Time | Temp. | Catalyst | Mole per cent cat. | Ratio MeNO₃ to ketone | Conversion |
|--------|------|-------|----------|--------------------|-----------------------|------------|
| | Hours | | | | | Per cent |
| Methyl ethyl | 48 | Reflux | Et₂NH | 20 | 1:1 | 29.2 2-ethyl-2-methyl-1,3-dinitropropane. |
| Do | 40 | do | Piperidine | 20 | 2:1 | 31.8 2-ethyl-2-methyl-1,3-dinitropropane. |
| Diethyl | 110 | do | Et₂NH | 20 | 2:1 | 14.5 2,2-diethyl-1,3-dinitropropane. |
| Methyl isobutyl | 48 | 105 | Piperidine | 23 | 3:1 | 14.9 2-isobutyl-2-methyl-1,3-dinitropropane. |
| Methyl propyl | 76 | Reflux | Et₂NH | 20 | 2:1 | 30.0 2-methyl-2-propyl-1,3-dinitropropane. |

[1] The light yellow oil solidified on cooling and on recrystallization ether gave large, colorless, glistening plates or flakes having the following physical properties:

|  | °C. |
|---|---|
| B. P.₁₀ | 141–143 |
| M. P. | 59–60 |

| Analysis | Carbon | Hydrogen |
|----------|--------|----------|
| | Per cent | Per cent |
| Theoretical | 44.2 | 7.4 |
| Found | 44.1 | 7.2 |

In each of the examples of the above table substantially only the dinitroalkane was produced.

As previously indicated, for a given set of reaction conditions, the proportion of catalyst to reactants has an important bearing on the results obtained. Table III below shows the results obtained from a series of operations in which the amount of catalyst was the only variable. In each case, one mole of nitromethane and 0.5 mole of acetone were refluxed together for twenty-four hours with varying amounts of piperidine. It will be noted that as the amount of catalyst was increased, the conversion improved rapidly until the molal ratio of nitromethane to acetone to piperidine reached 10:5:1. Further increase in the amount of catalyst resulted in a lowered conversion and a rapid increase in the amount of tarry residue left after the distillation of the 1,3-dinitro-2,2-dimethylpropane.

Table III

| Ratio reactants MeNO₂:Me₂CO:C₅H₁₁N | Yield gm. DNP [1] | Conversion to DNP [1] |
|---|---|---|
| | | Per cent |
| 167:88:1 | 8.0 | 9.9 |
| 88:44:1 | 15.0 | 18.5 |
| 44:22:1 | 23.5 | 29.0 |
| 22:11:1 | 33.5 | 41.3 |
| 10:5:1 | 37.0 | 45.6 |
| 12:6:1 | 39.0 | 48.2 |
| 10:5:1 | 39.5 | 48.7 |
| 9.4:4.7:1 | 39.0 | 48.2 |
| 8.5:4.2:1 | 38.0 | 47.0 |
| 7.1:3.5:1 | 35.0 | 43.2 |

[1] 1,3-dinitro-2,2-dimethylpropane.

Varying the catalyst also permits one to regulate the character of the reaction products obtained. The use of dimethylamine, for example, gives rise to the formation of increased proportions of 4,4-dimethyl-5-nitro-2-pentanone from acetone and nitromethane, instead of primarily 1,3-dinitro-2,2-dimethylpropane as is the case when piperidine or diethylamine is used as the catalyst. By taking advantage of this fact and at the same time increasing the ratio of the ketone to the nitromethane the condensation product obtained consists essentially of the nitro ketone.

While, as previously pointed out, we prefer to carry out the reaction at the reflux temperature of the mixture, it is in some cases advantageous to use somewhat higher temperatures. We have found, for example, that by raising the reaction temperature to 105° C.–115° C. it is possible in some cases to bring about as much as a twenty per cent increase in the conversion over that obtained at the reflux temperature, other conditions remaining the same. This is illustrated by the data shown in the following table:

Table IV

| Time | Temp. | Moles catalyst | Moles ratio MeNO₂:Me₂CO:Et₂NH₂ [1] | Conversion to DNP |
|------|-------|----------------|------------------------------------|-------------------|
| Hours | °C. | | | Per cent |
| 37 | Reflux | 0.05 | 10:5:1 | 43.5 |
| 32 | 110–115 | 0.05 | 10:5:1 | 54.0 |

[1] 1,3-dinitro-2,2-dimethylpropane.

Now having described our invention, what we claim as new and novel is:

1. In a process for the condensation of nitromethane with a ketone of the group consisting of aliphatic ketones and alicyclic ketones, the step which comprises effecting said condensation in the presence of at least 5 mole per cent of an amine having a dissociation constant in water in excess of $1 \times 10^{-7}$ and at a temperature ranging from about 80° to 125° C.

2. In a process for the condensation of nitromethane with a ketone of the group consisting of aliphatic ketones and alicyclic ketones, the step which comprises effecting said condensation in the presence of in excess of 5 mole per cent of an amine having a dissociation constant in water in excess of $1 \times 10^{-7}$, and at a temperature ranging from about 80° to 125° C.

3. In a process for the condensation of nitromethane with a ketone of the group consisting of aliphatic ketones and alicyclic ketones, the step which comprises effecting said condensation in the presence of at least 5 mole per cent of an amine having a dissociation constant in water in excess of $1 \times 10^{-7}$, for a period of time in excess of 24 hours, and at a temperature ranging from about 80° to 125° C.

4. In a process for the condensation of nitromethane with a ketone of the group consisting of aliphatic ketones and alicyclic ketones, the step which comprises effecting said condensation in the presence of in excess of 5 mole per cent of an amine having a dissociation constant in water in excess of $1 \times 10^{-7}$, for a period of time in excess of 24 hours, and at a temperature ranging from about 80° to 125° C.

5. In a process for the condensation of nitromethane with an aliphatic ketone, the step which comprises condensing nitromethane with not in excess of equimolar proportions of an aliphatic ketone in the presence of at least 5 mole per cent of an amine having a dissociation constant in water in excess of $1 \times 10^{-7}$, and at a temperature ranging from about 80° to 125° C.

6. In a process for the condensation of nitromethane with acetone, the step which comprises condensing nitromethane with in excess of equimolar proportions of acetone in the presence of at least 5 mole per cent of an amine having a dissociation constant in water in excess of $1 \times 10^{-7}$, and at a temperature ranging from about 80° to 125° C.

HENRY B. HASS.
JAMES F. BOURLAND.